United States Patent
Matessa et al.

(10) Patent No.: US 8,473,650 B1
(45) Date of Patent: Jun. 25, 2013

(54) METHOD AND SYSTEM FOR COLLECTING DEVICE INFORMATION

(75) Inventors: Matthew Matessa, Evans City, PA (US); Huynh Duc Mai, Milpitas, CA (US)

(73) Assignee: Netapp, Inc., Sunnyvale, CA (US)

(*) Notice: Subject to any disclaimer, the term of this patent is extended or adjusted under 35 U.S.C. 154(b) by 158 days.

(21) Appl. No.: 12/699,780

(22) Filed: Feb. 3, 2010

(51) Int. Cl.
*G06F 3/00* (2006.01)
*G06F 13/14* (2006.01)

(52) U.S. Cl.
USPC .......................................... 710/62; 710/241

(58) Field of Classification Search
USPC .......................................................... 700/15
See application file for complete search history.

(56) References Cited

U.S. PATENT DOCUMENTS

| | | | |
|---|---|---|---|
| 6,272,584 B1 * | 8/2001 | Stancil | 710/241 |
| 2002/0016897 A1 * | 2/2002 | Nerl | 711/170 |
| 2007/0055793 A1 * | 3/2007 | Huang et al. | 710/8 |
| 2007/0200518 A1 * | 8/2007 | Verge | 318/268 |
| 2007/0240019 A1 * | 10/2007 | Brady et al. | 714/43 |
| 2008/0201511 A1 * | 8/2008 | Deshpande et al. | 710/110 |
| 2008/0307134 A1 * | 12/2008 | Geissler et al. | 710/110 |

* cited by examiner

*Primary Examiner* — Henry Tsai
*Assistant Examiner* — Titus Wong
(74) *Attorney, Agent, or Firm* — Klein, O'Neill & Singh, LLP

(57) ABSTRACT

Method and system for interfacing with a peripheral device is provided. A microcontroller of the peripheral device is used to respond to a standard request for basic device information from a computing system. When the request for basic device information is received, the microcontroller reads the basic device information from a general purpose memory instead of a dedicated memory. The microcontroller emulates a memory controller by formatting the information and then sending a response to the computing system in a standard, expected format.

20 Claims, 4 Drawing Sheets

METHOD AND SYSTEM FOR COLLECTING DEVICE INFORMATION

TECHNICAL FIELD

The present disclosure relates to computing systems.

BACKGROUND

Computing systems today interface with various devices (for example, a fan unit and other devices) that may be referred to as peripheral devices. Before a computing system can effectively use these devices, it obtains basic device information, for example, serial number, model number, make of the device and other information during an initialization process. The peripheral device typically has a dedicated non-volatile memory (for example, an erasable programmable read only memory (EPROM)) with a controller (for example, an EPROM controller) for storing the basic device information and providing the information to the computing system.

The basic device information is typically obtained by a computing system processor that sends a standard request for information complying with a standard protocol. The format and nature of the request depends on the protocol type.

When the standard request is received, the EPROM controller typically responds to the request in a standard format. This can be a challenge if the peripheral device does not have a dedicated EPROM with the stored basic device information and the computing system is expecting a standard response. Continuous efforts are being made to improve processor and peripheral device communication.

SUMMARY

In one embodiment, a microcontroller of a peripheral device is used to respond to a standard request for basic device information from a computing system. When the request for basic device information is received, the microcontroller reads the basic device information from a general purpose memory instead of a dedicated memory that is used in conventional systems for storing such information. The microcontroller emulates a memory controller by formatting the information and then sending a response to the computing system in a standard, expected format. The computing system is unaware of who is responding to the request and hence no change is needed at the computing system level to obtain the basic device information.

In another embodiment, a machine implemented method for collecting information regarding a peripheral device operationally coupled to a computing system having a processor for executing programmable instructions is provided. A request for information from the processor is received by a microcontroller of the peripheral device. The microcontroller retrieves the requested information from a general purpose non-volatile memory. The microcontroller emulates a memory controller and transmits the requested information to the processor in a format expected by the processor.

In yet another embodiment, a machine implemented method is provided. The method includes: interfacing a processor of a computing system with a peripheral device having a micro-controller via a bus; receiving a request for peripheral device information from the processor, the request being received by a microcontroller of the peripheral device; the microcontroller retrieving the requested information from a general purpose non-volatile memory; and the microcontroller emulating a memory controller and transmitting the requested information to the processor in a format expected by the processor.

In another embodiment, a computing system is provided. The computing system includes a processor interfacing with a peripheral device having a micro-controller via a bus. The micro-controller is configured to receive a request for peripheral device information from the processor; retrieve the requested information from a general purpose non-volatile memory; emulate a memory controller and transmit the requested information to the processor in a format expected by the processor.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures.

DETAILED DESCRIPTION

As used in this disclosure, the terms "component" "module", "system," and the like are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick, flash memory device or any other non-volatile memory device, or any other storage device, in accordance with the claimed subject matter.

Figure 1A:
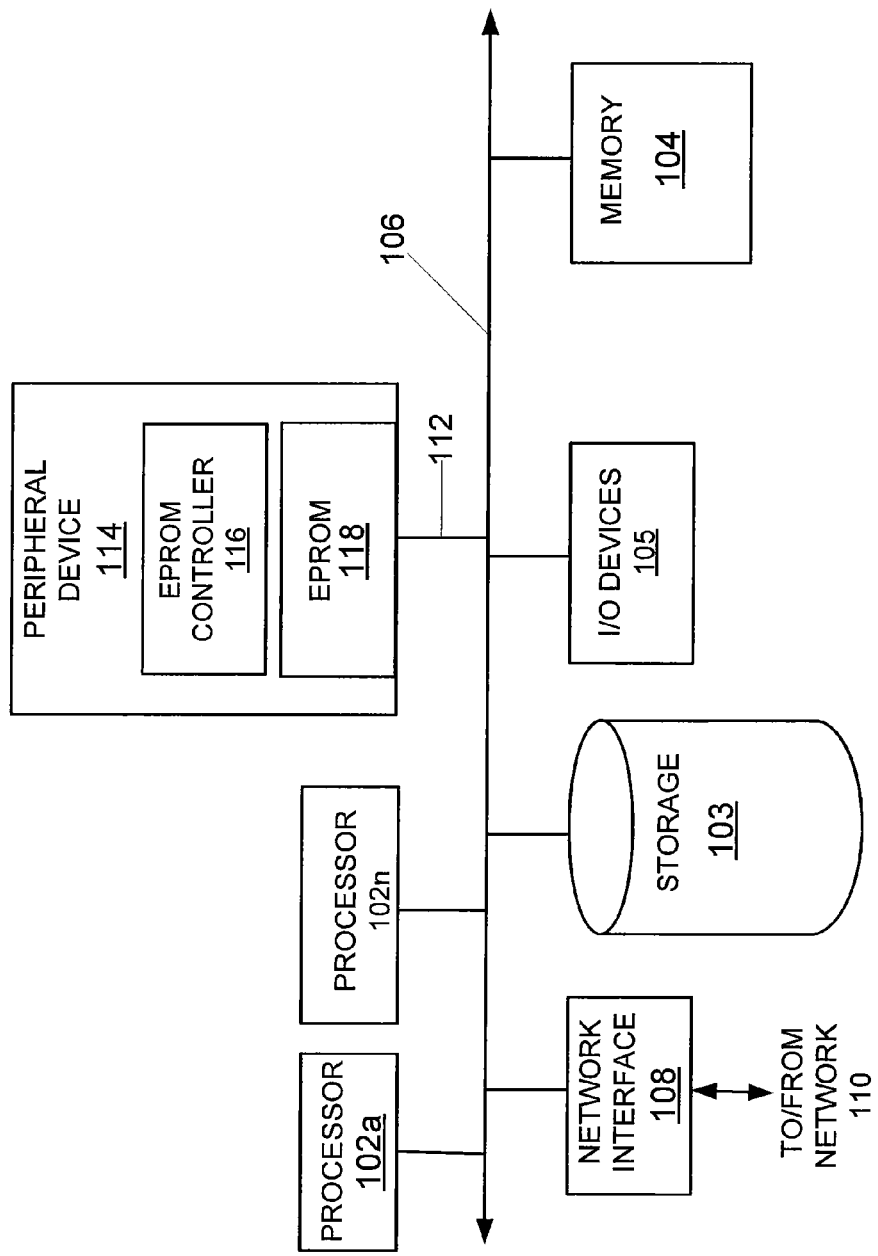
FIG. 1A shows a block diagram of a conventional computing system.

FIG. 1A is a high-level block diagram of a conventional system 100 for communicating with, and for receiving basic device information from a peripheral device 114. An example of peripheral device 114 may be a fan unit for a computing system that is used to circulate air within the physical system that embodies system 100. The term basic device information includes a serial number, manufacturer's name, model name/number and other identifying information that may be used by the computing system to initiate communication with the peripheral device. The adaptive embodiments are not limited to a fan unit or any particular type of peripheral device.

System 100 includes one or more processors 102 (shown as 102a-102n) and memory 104, coupled to a bus system 106. The bus system 106 is an abstraction that represents any one or more separate physical buses and/or point-to-point connections, connected by appropriate bridges, adapters and/or controllers. The bus system 106, therefore, may include, for example, a system bus, a Peripheral Component Interconnect (PCI) bus, a HyperTransport or industry standard architecture (ISA) bus, a small computer system interface (SCSI) bus, a universal serial bus (USB), an Institute of Electrical and Electronics Engineers (IEEE) standard 1394 bus (sometimes referred to as "Firewire") or any other bus.

The processors 102 are the central processing devices (CPUs) of system 100 and, thus, control its overall operation. In certain embodiments, processors 102 accomplish this by executing programmable instructions stored in memory 104. Processors 102 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 104 represents any form of random access memory (RAM), read-only memory (ROM), flash memory, or the like, or a combination of such devices. Memory 104 includes the main memory of system 100.

Processor 102 communicates with peripheral device 114 via a bus 112 (may also be referred to as a communication channel). Different standard buses may be used to communicate with the peripheral device 114, for example, $I^2C$ bus is a commonly used serial bus to attach peripherals to a motherboard. SMBUS, Serial Peripheral Interface (SPI bus), and other bus types may also be used for communicating with peripheral device 114.

Peripheral device 114 uses a dedicated non-volatile memory (for example, EPROM) 118 to store basic device information. Controller 116 (also referred to as EPROM controller 116) controls the overall operation of memory 118 including responding to requests for device information.

When processor 102 detects peripheral device 114, it sends a request to obtain basic device information. The format of the request depends on a type of bus 112. For example, if bus 112 is an $I^2C$ bus, then the request complies with the $I^2C$ bus standard.

EPROM controller 116 provides the requested information in a format that is expected by processor 102. One disadvantage with this approach is that one has to use a dedicated memory for storing basic device information. This increases costs and complexity for a system, especially if the peripheral device 114 has a microcontroller with a general purpose memory. The adaptive embodiments described herein overcome these disadvantages.

Also connected to processors 102 through bus system 106 are one or more internal mass storage devices 103, and a network interface 108. Internal mass storage devices 103 may be or may include any conventional medium for storing large volumes of data in a non-volatile manner, such as one or more magnetic or optical based disks.

The network interface 108 provides the processing system 100 with the ability to communicate with remote devices over a network 110. Network interface 108 may be, for example, an Ethernet adapter, a FC adapter, or the like.

The processing system 100 also includes one or more input/output (I/O) devices 105 coupled to the bus system 106. The I/O devices 105 may include, for example, a display device, a keyboard, a mouse, etc.

Figure 1B:
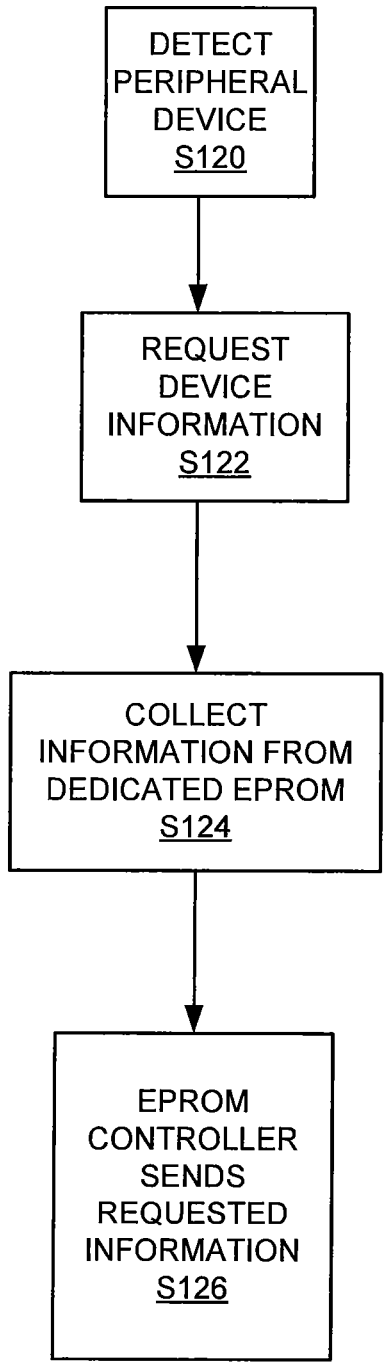
FIG. 1B shows a conventional process flow diagram for obtaining peripheral device information.

FIG. 1B shows a conventional process flow diagram for obtaining basic device information. The conventional process begins in block S120 when processor 102 detects device 114. In block S122, processor 102 sends a request for basic device information via bus 112.

In block S124, EPROM controller 116 obtains the device information from dedicated memory 118. In block S126, EPROM controller sends the requested information sent to processor 102.

Figure 2A:
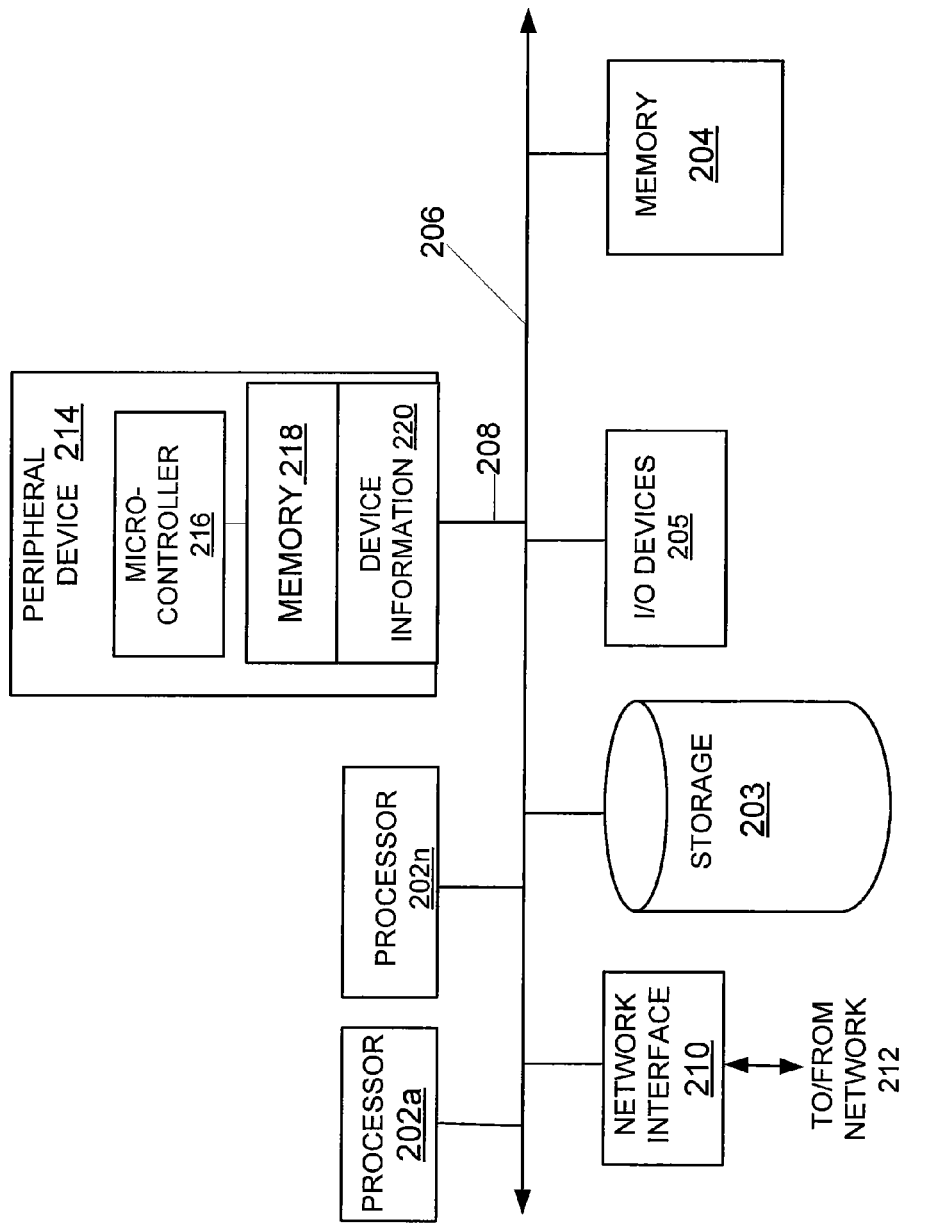
FIG. 2A shows a block diagram of a computing system, according to one embodiment.

FIG. 2A shows a block diagram of a system 200, according to one embodiment. System 200 includes processors 202a-202n (similar to processors 102a-102n), a memory 204 (similar to memory 104), bus 206 (similar to bus 106), network interface 210 (similar to network interface 108) for communicating via network 212, I/O devices 205 (similar to I/O devices 105) and a storage device 203 (similar to storage device 103).

System 200 also includes a peripheral device 214 having a micro-controller 216 with access to a generic non-volatile memory 218. Micro-controller 216 stores basic device information 220 in memory 218. However, unlike memory 118 (FIG. 1A), memory 218 is not a dedicated memory used just for storing device information. This saves cost because one does not have to provide a dedicated memory to just store basic device information.

Processor 202 communicates with device 214 via a bus 208 (or communication channel 208) to obtain basic device information. Bus 208 may be similar to bus 112.

When processor 202 sends a request via bus 208 to obtain basic device information, micro-controller 216 reads information 220 from memory 218, formats the information to comply with bus 208 requirements and sends the formatted information via bus 208.

Micro-controller 216 formats the requested information based on the bus type. For example, if bus 208 is an $I^2C$ bus, then micro-controller 216 formats the response to comply with $I^2C$ requirements. Processor 202 is unaware of who is responding to the request, i.e. EPROM controller 116 from FIG. 1A or micro-controller 216 from FIG. 2A.

This embodiment has advantages because one can use a micro-controller of a device to respond to processor 202 requests without using a dedicated memory or making any changes at the processor level.

Figure 2B:
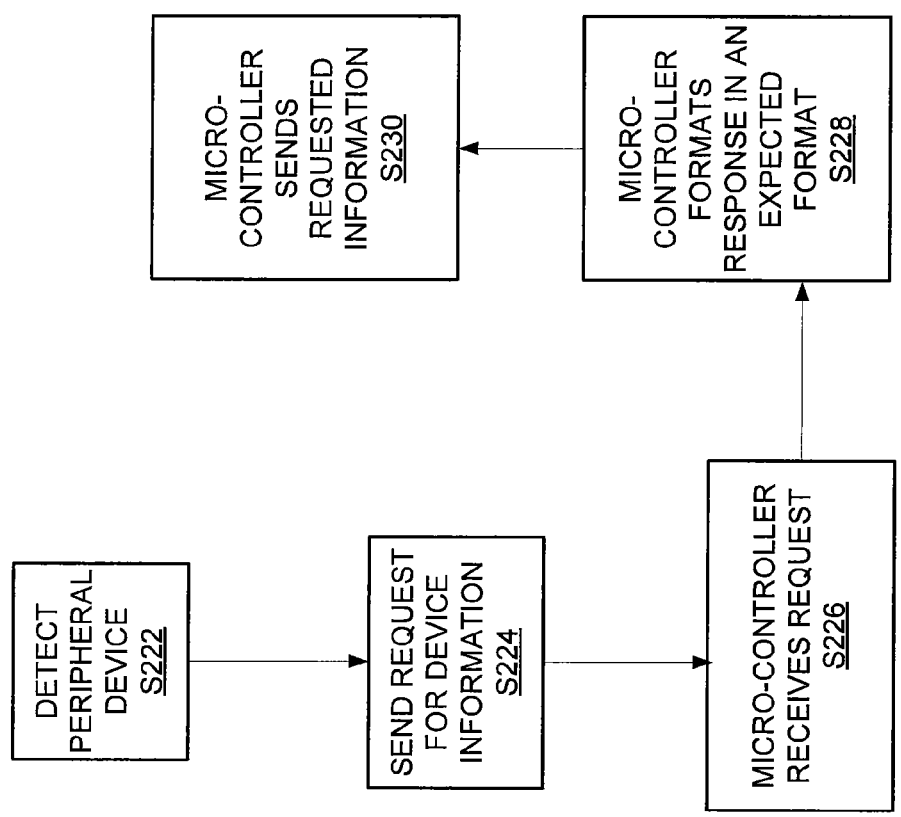
FIG. 2B shows a process flow diagram for collecting basic device information, according to one embodiment.

FIG. 2B shows a process flow diagram of using the system 200, according to one embodiment. The process flow begins in block S222, when processor 202 detects device 214. Thereafter, in block S224, processor 202 sends a request to device 214 to collect basic device information. In block S226, the request is received by the micro-controller 216 of device 214.

The micro-controller 216 reads the basic device information 220 from memory 218. In block S228, the information is formatted to comply with bus 208 requirements. Micro-controller 216 formats the information. Thereafter, in block S230, the requested information is sent to processor 202 in a format expected by processor 202.

In one embodiment, a dedicated memory to store basic device information is not needed or used. A micro-controller is used to receive and respond to a processor request for basic device information. No changes are needed at the processor level. This results in cost savings because one does not have to provide a dedicated memory for storing basic device information.

Thus, a method and apparatus for communicating with a peripheral device have been described. Note that references throughout this specification to "one embodiment" or "an embodiment" mean that a particular feature, structure or characteristic, described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A machine implemented method for collecting identification information for identifying a peripheral device operationally coupled to a computing system having a processor for executing programmable instructions, comprising:
   storing the identification information in a general-purpose memory of the peripheral device without having to use a dedicated memory at the peripheral device used for only storing the identification information; wherein a micro-controller of the peripheral device manages the general-purpose memory and the processor uses the identification information for initiating communication with the peripheral device;
   receiving a request for the identification information from the processor, the request being received by the micro-controller of the peripheral device;
   the microcontroller retrieving the requested identification information from the general purpose non-volatile memory of the peripheral device; and
   the microcontroller transmitting the requested identification information to the processor in a format expected by the processor such that the processor is unaware of whether the microcontroller or any memory controller responded to the request.

2. The machine implemented method of claim 1, wherein the peripheral device is accessible to the processor via an $I^2C$ bus.

3. The machine implemented method of claim 1, wherein the peripheral device is a fan unit for the computing system.

4. The machine implemented method of claim 1, wherein the identification information provides a serial number for the peripheral device.

5. A machine implemented method, comprising:
   interfacing a processor of a computing system with a peripheral device having a micro-controller via a bus;
   storing the identification information in a general-purpose memory of the peripheral device without having to use a dedicated memory at the peripheral device used for only storing the identification information; wherein a micro-controller of the peripheral device manages the general-purpose memory and the processor uses the identification information for initiating communication with the peripheral device;
   receiving a request for the peripheral device identification information from the processor, the request being received by a microcontroller of the peripheral device;
   the microcontroller retrieving the requested identification information from the general purpose non-volatile memory of the peripheral device; and
   the microcontroller transmitting the requested identification information to the processor in a format expected by the processor such that the processor is unaware of whether the microcontroller or any memory controller responded to the request.

6. The machine implemented method of claim 5, wherein the bus is an $I^2C$ bus.

7. The machine implemented method of claim 5, wherein the peripheral device is a fan unit for the computing system.

8. The machine implemented method of claim 5, wherein the format depends on a bus type used to interface the peripheral device with the processor.

9. The machine implemented method of claim 5, wherein the identification information provides a serial number for the peripheral device.

10. A computing system, comprising:
    a processor interfacing with a peripheral device having a micro-controller via a bus, the microcontroller managing a general-purpose memory of the peripheral device;
    wherein the peripheral device stores peripheral device identification information for the processor to initiate communication with the peripheral device at the general-purpose memory without having to use a dedicated memory for just storing the identification information; and wherein the micro-controller is configured to receive a request for peripheral device identification information from the processor; retrieve the requested identification information from a general purpose non-volatile memory of the peripheral device and transmit the requested identification information to the processor in a format expected by the processor such that the processor is unaware of whether the microcontroller or any memory controller responded to the request.

11. The system of claim 10, wherein the bus is an $I^2C$ bus.

12. The system of claim 10, wherein the peripheral device is a fan unit for the computing system.

13. The system of claim 10, wherein the format depends on a bus type used to interface the peripheral device with the processor.

14. The system of claim 10, wherein the identification information provides a serial number for the peripheral device.

15. The system 10, wherein the identification information provides a model number of the peripheral device.

16. The system of claim 10, wherein the identification information provides a name of a manufacturer of the peripheral device.

17. The method of claim 1, wherein the identification information provides a model number of the peripheral device.

18. The method of claim 1, wherein the identification information provides a name of a manufacturer of the peripheral device.

19. The method of claim 5, wherein the identification information provides a model number of the peripheral device.

20. The method of claim 5, wherein the identification information provides a name of a manufacturer of the peripheral device.

* * * * *